No. 670,457. Patented Mar. 26, 1901.
H. B. RUGGLES.
FRUIT BRUSHER.
(Application filed Oct. 20, 1900.)
(No Model.) 2 Sheets—Sheet 1.
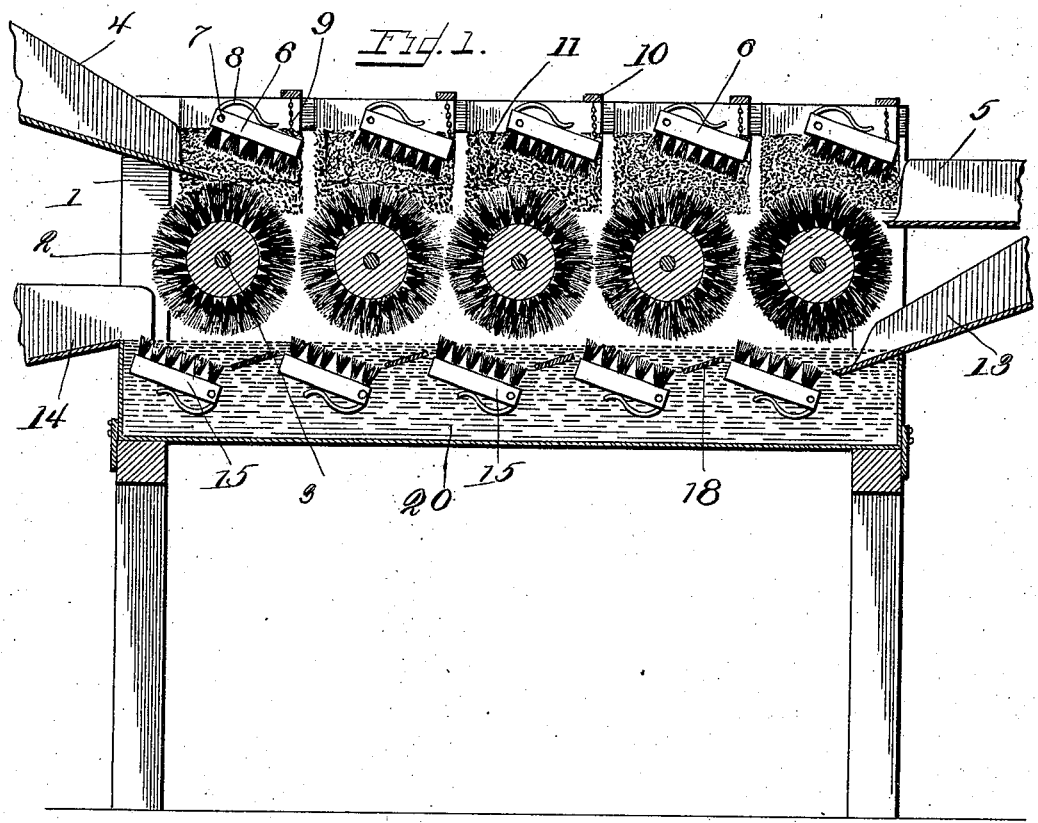
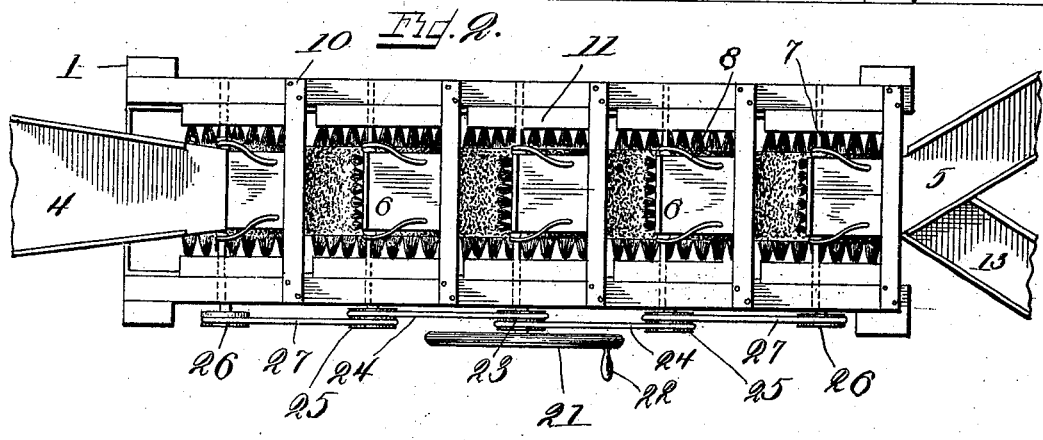
Witnesses
J B Weir
Ira D Perry
Inventor
Henry B. Ruggles
by Henry Hatt
Atty
THE NORRIS PETERS CO., PHOTO-LITHO., WASHINGTON, D. C.

No. 670,457. Patented Mar. 26, 1901.
H. B. RUGGLES.
FRUIT BRUSHER.
(Application filed Oct. 20, 1900.)

(No Model.) 2 Sheets—Sheet 2.

Witnesses
J B Weir
Ira D. Perry

Inventor
Henry B. Ruggles
by Henry Mach
Atty

UNITED STATES PATENT OFFICE.

HENRY B. RUGGLES, OF REDLANDS, CALIFORNIA.

FRUIT-BRUSHER.

SPECIFICATION forming part of Letters Patent No. 670,457, dated March 26, 1901.

Application filed October 20, 1900. Serial No. 33,739. (No model.)

*To all whom it may concern:*

Be it known that I, HENRY B. RUGGLES, a citizen of the United States, residing at Redlands, in the county of San Bernardino and State of California, have invented certain new and useful Improvements in Fruit-Brushers, of which the following is a specification.

This invention relates to fruit brushers or machines for cleaning fruit or the like, particularly oranges and lemons; and it has for its object to provide an improved machine of this character of great capacity and efficiency, capable of being manufactured at low cost, and of successful use in carrying on either a wet or dry brushing or cleaning process.

The invention consists in the matters hereinafter set forth, and particularly pointed out in the appended claims, and will be fully understood from the following detailed description of a construction embodying the invention in one form when considered in connection with the accompanying drawings, illustrative thereof, and in which—

Figure 3:
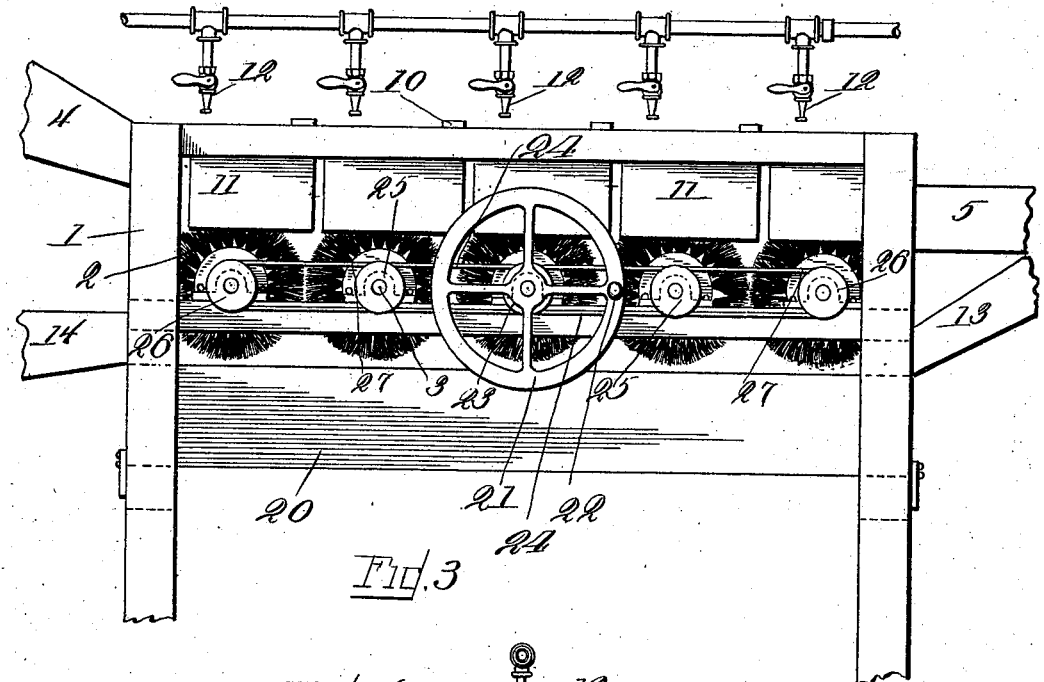
Figure 4:
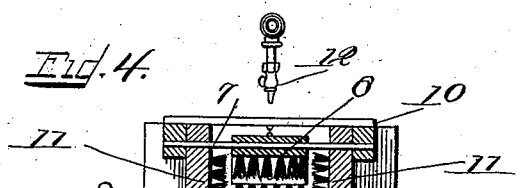
Figure 5:
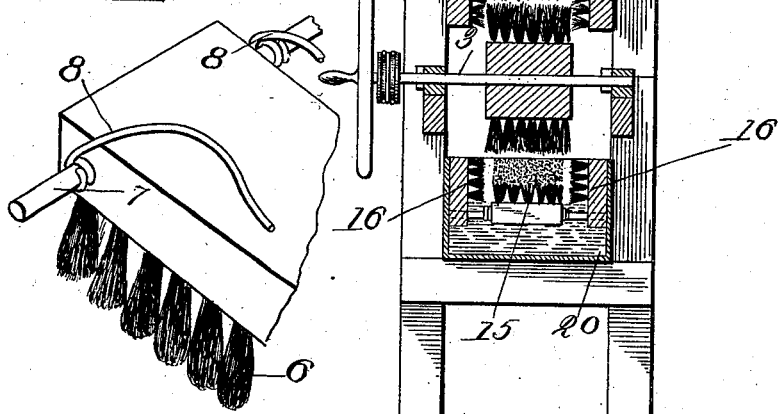

Figure 1 is a longitudinal sectional elevation of the machine. Fig. 2 is a top plan view thereof. Fig. 3 is a side elevation. Fig. 4 is a transverse sectional elevation. Fig. 5 is a perspective detail of one of the swinging brushes.

In said drawings, 1 designates the machine-frame, within which a number of cylindric brushes 2 are mounted on rotating shafts 3, that extend transversely across the framework. These brushes, which are herein shown as five in number, are placed as closely together as is practicable without bringing their revolving surfaces in contact and are all rotated in the same direction, so that the fruit fed down upon the first brush through a suitable entrance-chute 4 will be carried along and passed from one to the other until finally discharged to an outlet-chute 5 at the opposite end of the machine. Above the rotating brushes 2 is a set of pivoted or swinging non-revoluble brushes 6, which are herein shown as yieldably supported upon pivot-pins 7 and as normally pressed downward toward the rotary brushes by any suitable springs 8, the downward movement of the brushes under the tension of these springs being limited by any suitable stop device, consisting in this instance of links or chains 9, which loosely suspend the swinging ends of the brushes from superjacent cross-bars 10 of the frame. Side guards to prevent the fruit from rolling out laterally between the swinging and rotary brushes are shown as provided in the form of inwardly-facing stationary brushes 11, that are secured to the frame on each side of the brushes 6, as better shown in Figs. 2 and 4.

The foregoing elements, together with suitable driving connection for rotating the several brushes 2, constitute all the essentials of one very practicable form of this improved brusher, which may be worked dry, if desired, or may be employed to wash the fruit also if the brushes are supplied with water from any suitable source, as from overhead taps 12. As a further improvement, also, and to greatly increase the capacity of the machine without adding very greatly to its cost or materially increasing the power required for its operation, the machine may readily be made to work double by providing inlet and outlet chutes 13 and 14 for admitting and discharging fruit to and from the under sides of the rotating brushes, a second set of spring-pressed swinging brushes 15, of substantially similar construction as the upper swinging brushes 6, being suitably located beneath the rotary brushes 2 to hold the fruit yieldingly against the latter. Lateral brushes 16, forming side guides, will also be provided at the sides of the brushes 15 to keep the fruit upon the latter and to prevent the fruit from falling down between the brushes 15 or from being pocketed in stationary position between their ends. Downwardly and forwardly projecting guide-plates 18 are provided between them to direct the fruit along from one to the other. A tank 20 is also herein shown as provided around the brushes 15 and 16 to keep them wet when it is desired to wash the fruit, and this tank may be kept filled by the water which drips through the brushes above from the taps 12.

Any suitable hand or power mechanism for rotating the brushes may be provided, that herein shown comprising a balance-wheel 21, secured to the end of one of the shafts 3 and provided with a crank-handle 22, by which it can be rotated. A double belt-pulley 23 is also provided on the same shaft, and from this pulley belts 24 lead to double pulleys 25, fixed on the ends of the adjacent shafts 3, and these pulleys 25 in turn transmit motion to pulleys 26 on the ends of the outer shafts 3 through the medium of belts 27. With this construction it will be obvious that all the brushes will be rotated in the same direction as that in which the hand-wheel is turned.

It will of course be understood that various changes may be made in the details of the construction shown and still be within the scope of the invention claimed.

I claim as my invention—

1. A fruit-brusher comprising a plurality of rotating brushes mounted in proximity on separate axes of rotation and forming a rolling support for the fruit, means for rotating said brushes, stationary brushes mounted in proximity to the rotating brushes, and means for introducing and guiding the fruit between the stationary and rotating brushes in a direction transverse to the axes of rotation of the latter, substantially as described.

2. A fruit-brusher comprising a plurality of rotating brushes mounted in proximity on separate stationary axes of rotation, means for rotating said brushes in the same direction, stationary brushes yieldingly mounted in proximity to the rotating brushes, and means for introducing and guiding the fruit between the stationary and rotating brushes in a direction transverse to the axes of rotation of the latter, substantially as described.

3. A fruit-brusher comprising a plurality of rotating brushes mounted in proximity to each other on separate horizontal axes of rotation and furnishing a rolling support for the fruit, means for rotating said brushes, spring-pressed stationary brushes mounted yieldingly above the rotating brushes, and means for introducing and guiding the fruit between the rotating and stationary brushes in a direction at right angles to the axes of rotation of the latter, substantially as described.

4. A fruit-brusher comprising a plurality of rotating brushes mounted in proximity, means for rotating said brushes in same direction, non-rotating brushes arranged above and below the rotating brushes, means for introducing the fruit between the rotating brushes and the upper non-rotating brushes at one end of the machine, and means for introducing the fruit between the rotating brushes and the lower non-rotating brushes at the other end, substantially as described.

5. A fruit-brusher comprising a plurality of rotating brushes mounted in proximity, a plurality of yieldingly-mounted brushes arranged beneath the rotating brushes and downwardly and forwardly projecting guide-plates interposed between the yielding brushes, substantially as described.

In testimony that I claim the foregoing as my invention I affix my signature, in presence of two subscribing witnesses, this 17th day of September, A. D. 1900.

HENRY B. RUGGLES.

Witnesses:
CHAS. E. TRUESDELL,
F. LOUISE PHELPS.